April 11, 1933.  R. A. WEBSTER  1,903,524

HARDNESS TESTING DEVICE

Filed April 17, 1929

Inventor:
R. A. Webster,
By C. C. Hines,
Attorney.

Patented Apr. 11, 1933

1,903,524

UNITED STATES PATENT OFFICE

ROBERT A. WEBSTER, OF SANTA MONICA, CALIFORNIA

HARDNESS TESTING DEVICE

Application filed April 17, 1929. Serial No. 355,769.

This invention relates to a device or tool for testing the hardness of materials, particularly metals, and one object of the invention is to provide a simple, reliable and efficient type of device whereby degrees of hardness of a metal within certain limits may be easily and rapidly determined.

Another object of the invention is to provide a device or tool of the character described which is adapted for gauging certain degrees of hardness within certain toleration limits for each degree and to thus serve as a quick and convenient "go" or "no go" gauge for the purpose.

Still another object of the invention is to provide a hardness-tester which is adjustable within determined ranges to gauge different specified relative degrees of hardness, employing a particular degree, arbitrary or otherwise, as a basis of calculation, and in which interchangeable combinations of parts may be used to adapt the tool for testing varying degrees of hardness within different hardness-degree ranges.

With these and other objects in view, which will appear in the course of the subjoined description, the invention consists of the features of construction, combination and arrangement of parts, hereinafter fully described and claimed, reference being had to the accompanying drawing, in which:—

Figure 1:
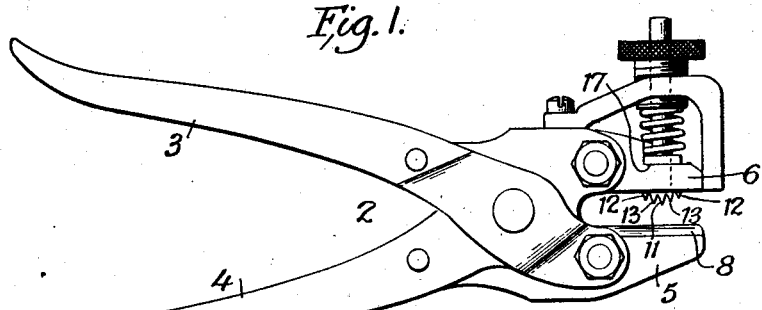
Fig. 1 is a side elevation of one form of tool embodying the invention.
Figure 2:
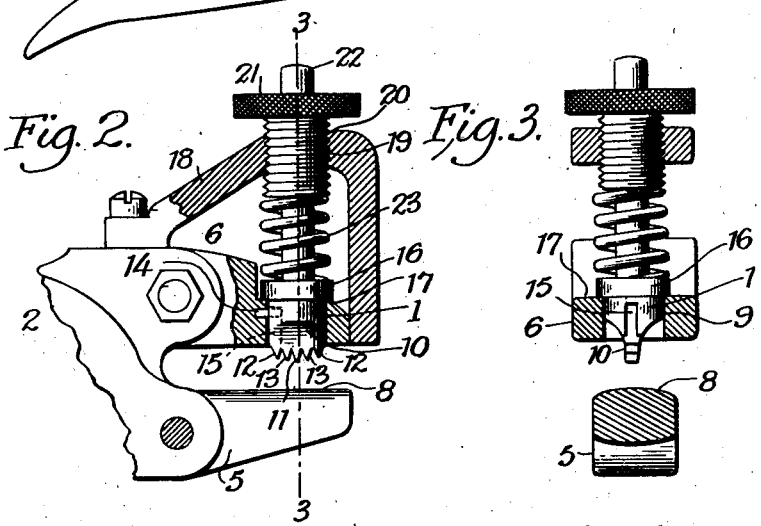
Fig. 2 is a similar view of the jaws of the tool, showing one of the jaws and the supporting bracket applied thereto in longitudinal section.
Figure 3:
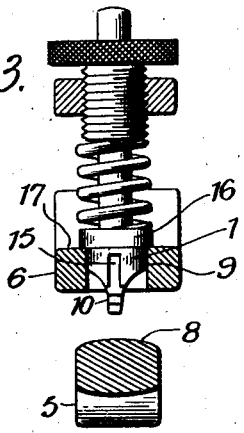
Fig. 3 is a vertical transverse section on line 3—3 of Fig. 2 showing the impression plunger in end elevation.

Referring now particularly to Figs. 1 to 6, inclusive, of the drawing, 1 denotes the impression member of the tool and 2 means for supporting the impression member and backing the material being tested and for actuating the said impression member. The said means for supporting the impression member and backing the material and actuating the impression member may vary in construction and assume any form suitable for the purpose, but, as shown in the present instance, is in the general form of a pair of parallel motion pliers embodying the crossed and pivotally connected actuating handles 3 and 4 carrying the pivotally mounted parallel motion jaws 5 and 6. Between the opposed faces of these jaws the work or material 7 to be tested is designed to be placed, the jaw 5 serving as an anvil or backing support for the work, while the jaw 6 serves as a support for the impression member 1. The face 8 of the jaw 5 on which the work rests is preferably transversely curved or rounded to adapt it for backing flat or round (including tubular) pieces of material to be supported and tested.

The impression member 1 in the example shown comprises a hard metal plunger-penetrator composed of a body slidably mounted in a guide opening 9 in the jaw 6, the lower portion of said body being reduced to provide a blade portion 10 having an arcuate or longitudinally curved toothed penetrating edge for engagement with the work. This penetrating edge is divided so as to provide a plurality of penetrating teeth or projections terminating at different levels. In the present instance the penetrating edge is shown as having three marking projections consisting of a single central tooth or projection 11, having the greatest extent of projection or arranged at the lowest level, a pair of outer teeth or projections 12 arranged equidistantly on opposite sides of the central tooth and having the least extent of projection or arranged at the highest level and conjointly forming a marking surface arranged at the highest level, and a pair of intermediate teeth or projections 13 arranged between the tooth 11 and the respective teeth 12 and having a median extent of projection or arranged at a level between the levels of the teeth 11 and 12 and conjointly forming a marking surface disposed at an intermediate level.

The jaw 6 has a lower plane surface beyond which the marking edge of the penetrator plunger projects. Suitable means, such as a pin, key or feather 14 on the jaw 6 and engaging a groove 15 in the plunger body, is provided for preventing rotation of the plunger and maintaining the marking edge parallel with the jaw, and a collar or stop abutment 16 on the plunger is engageable with an abutment or stop surface 17 on the jaw 6 to limit the downward movement of the plunger. To the jaw 6 is secured a bracket or frame member 18 having a threaded opening 9 receiving an externally threaded adjustable bushing sleeve 20 having at its upper end a milled flange 21. Through this sleeve projects a guide stem 22 on the plunger and surrounding said stem between the collar 16 and the lower end of the sleeve 20 is a coiled backing spring 23 for the plunger, the load of which on the plunger, or the resistance of which to an upward yielding movement of the plunger, may be varied by adjustment of the sleeve 20. This arrangement of the plunger, spring and sleeve (load varying member) is, of course, not essential, as any other suitable arrangement of the same or equivalent parts may be employed, and the form and construction of such parts may be modified or changed at will so long as the working principle of the invention is preserved. Also the use of an actuating device 2 of the type disclosed is not essential, as various forms of actuating devices may be employed without departing from the principle or spirit of the invention. Also the number of impression members on the plunger may be varied, provided that, in the case of the use of an indented broken or interrupted (serrated) impression edge, a plurality of at least two teeth or projections of different depths be employed so that the deeper the penetration the greater the number of impressions made, or, in the case of the use of either a broken or continuous impression edge, the construction be such that the broken or continuous line given will vary as to length as well as to depth in gauging materials of two or more relatively different degrees of hardness.

In practice the parts may be so constructed and adjusted as to operate on any recognized scale system for determining hardness of materials, or to operate on any arbitary scale system established by the user or in a shop for determining the relative degrees of hardness of the same or different materials within certain limits. Thus, for instance, the device may be constructed and used for determining whether two or more varying pieces of the same kind of material, i. e., hard and soft aluminum alloys, are of the proper relative degrees of hardness for specified uses without treatment, or come within certain toleration limits, or are too hard or too soft with respect to such limits, and must be rejected, or whether material in use, as in a finished machine, has deteriorated to such a degree as to require replacement. A particular use for which the device is adapted is that of a shop tool for determining the suitability, with regard to condition, of a material, or different kinds of the same material, such as above noted, for use in the construction of airplane parts, or for testing the condition of such parts after assembly into the machine. The device may be further constructed and used, as in the illustrated example, for testing three or more grades of material with regard to relative hardness, and as an example a third material, in the same class as the two before mentioned, may be standard aluminum. With the particular device disclosed it may be assumed that the plunger, spring and sleeve are adjusted for penetration of a hard alumnium alloy by tooth 11 at a certain degree of pressure, and for penetration of a softer aluminum alloy by the teeth 11 and 13 at the same degree of pressure, and for penetration of standard aluminum by all the teeth 11, 12 and 13 at such degree of pressure. The device will thus indicate to the operator by the number of impressions made and length of the indented line produced, or depth of the indentations or impressions, or both, whether or not the material tested is hard, medium or soft according to the determined scale or relative nature of the materials. The man in the stock room of a factory may, therefore, easily and quickly tell whether the material he is handing out is a hard aluminum alloy, a soft aluminum alloy or standard aluminum, and a workman who is called upon to make small parts out of scraps of sheet or tube material of the same general appearance may determine rapidly just what the different pieces are. An inspector may also test the parts after assembly into a finished airplane, which is impossible with an ordinary testing machine.

Figure 4:
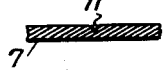
Figs. 4, 5 and 6 are sectional views through a piece of sheet material showing indicating marks made by the penetrator in tests upon relatively hard, medium and soft materials.
Figure 5:
Figure 6:

Fig. 4 shows the result of a test made in which a single indentation 11' of minimum depth or the smallest degree of penetration by the tooth 11 of the plunger has been formed in the material, indicating that the material is "hard" within the test range of the tool. Fig. 5 shows the result of a test made in which the penetrating surface of the plunger has entered the material to a deeper extent and three indentations 11' and 13' have been formed by the teeth 11 and 13, indicating that the material is "medium" within the range of the tool. Fig. 6 shows the result of a test made in which the penetrating surface of the plunger has entered the material to its deepest or maximum extent and five indentations 11', 12' and 13' have been formed by the teeth 11, 12 and 13, indicating that the material is "soft" within the test range of the tool. It will be observed that the variations of hardness are here indicated not only by the length of the broken or indented line produced and by number (1, 3 or 5) indentations but also by variations in depth of the indentations. Obviously instead of five teeth three only need be used for giving three different hardness indications, but the number and arrangement of teeth shown is preferred for various reasons.

While reference has been made only to the use of the device for testing hard and soft aluminum alloys and standard aluminum, it is to be understood that the device may be employed with equal advantages for testing other materials or for checking up the hardness of a material during different stages of manufacture, as in the different stages of metal rolling. The device may also be used in spinning, drawing, etc., to assure that the condition of the material is within the proper limits of hardness.

It will also be understood that the impression plungers and springs employed in this device may be of interchangeable character, or standardized, so that certain combinations of plungers and springs will cover certain ranges of hardness. Standard test blocks of known hardness might be furnished with each combination so that the adjusting bushing could be properly set and left permanently at that setting.

In this device the impression points or teeth on the plunger or impression member 1 extend only a very short distance beyond the bottom face of the jaw 6, so that when the work is squeezed between the jaws in testing the plunger moves only a very short distance, ensuring a very long life of spring. An important feature of the device is that no matter how much excess pressure is brought to bear on the tool handles, the load on the plunger is always constant, since any excess pressure on the handles simply compresses the work tighter between the jaws but cannot increase the load on the plunger, which is determined by spring adjustment. A very simple and accurate type of device may therefore be produced at a very low cost.

Having thus fully described my invention, I claim:—

1. A hardness testing device of the character described having a plurality of impression members movable in a direction toward and from the material to be tested and terminating in different planes perpendicular to the direction of movement, said members being operative for indicating by the number of said members penetrating a piece of material the hardness of the material with respect to a material of greater or less hardness, and means for actuating said members with relation to the material whose hardness is to be tested.

2. A hardness testing device of the character described having a plurality of conjointly movable impression teeth of different effective lengths and operative for indicating by the number of said teeth penetrating a piece of material and their degree of penetration thereof the hardness of the material with respect to a material of greater or less hardness, and means for actuating said impression teeth with relation to the material whose hardness is to be tested.

3. A hardness testing device of the character described comprising a plurality of conjointly movable impression teeth having their material entering ends extending on a curved line so as to terminate at different elevations with relation to each other and operative for indicating by the number thereof penetrating a piece of material the hardness of the material with respect to a material of greater or less hardness, and means for actuating said teeth with relation to the material whose hardness is to be tested.

4. A hardness testing device comprising an impression member having a plurality of penetrating projections of different effective lengths operative for indicating by number and depth of impressions formed thereby in a piece of material the hardness of said material with respect to a material of greater or less hardness, and means for actuating said impression member.

5. A hardness testing device comprising an impression member having a penetrating edge portion curved and indented so as to provide a plurality of alined impression members of different effective lengths and operative for penetrating a piece of material to different degrees for indicating the hardness of said material with respect to a material of greater or less hardness, and means for actuating said impression member.

6. A hardness testing apparatus embodying a support for the material to be tested, a support for an impression member, an impression member carried by the latter-named support and having a plurality of teeth of different effective lengths and operative for indicating by the number of said teeth penetrating the material and their degree of penetration the hardness of said material with respect to a material of greater or less hardness, and means for moving said supports toward and from each other.

7. A hardness testing apparatus embodying a support for the work, a support for an impression member, an impression member carried by the latter-named support and provided with a plurality of impression teeth of different effective lengths projecting therefrom and adapted to sink to different depths in the material for indicating different degrees of hardness thereof, a spring for backing said impression device, means for varying the load on the spring, and means for adjusting the supports toward and from each other.

8. A hardness testing device comprising a support for the work, a support for an impression plunger, an impression plunger carried by the latter-named support and provided with a plurality of impression teeth of different effective lengths projecting therefrom, a spring for backing said plunger, means for regulating the resistance of the spring to recession of the plunger, and means for moving said supports toward or from each other.

9. A hardness testing device comprising pivotally connected actuating handles, parallel motion jaws pivoted thereto, one of said jaws forming a support for the work, an impression plunger carried by the other jaw and provided with a plurality of impression teeth of different effective lengths projecting therefrom, a spring backing the plunger, and means for regulating the resistance of the spring to recession of the plunger.

10. A hardness testing device of the character described having an impression member movable toward and from a surface of a piece of material to be tested and presenting penetrating projections terminating in different planes perpendicular to the direction of movement, said projections being operative for indicating by the number of said projections penetrating the material to be tested and their extent of pentration the degree of hardness of the material with respect to a material of greater or less hardness.

In testimony whereof I affix my signature.

ROBERT A. WEBSTER.